United States Patent [19]

Kubota et al.

[11] 4,141,048
[45] Feb. 20, 1979

[54] VIDEO SIGNAL RECORDING AND/OR REPRODUCING APPARATUS

[75] Inventors: Yukio Kubota; Minoru Morio, both of Tokyo; Hidehiko Okada, Yokohama; Masahiro Kambara, Tokyo, all of Japan

[73] Assignee: Sony Corporation, Tokyo, Japan

[21] Appl. No.: 832,369

[22] Filed: Sep. 12, 1977

[30] Foreign Application Priority Data

Sep. 13, 1976 [JP] Japan ................... 51-109671

[51] Int. Cl.² ............... G11B 21/10; G11B 5/52; G11B 21/24
[52] U.S. Cl. .................... 360/77; 360/107; 360/109; 360/84
[58] Field of Search ................ 370/77-78, 370/69-71, 75-76, 84, 131, 134, 27, 64, 107-109

[56] References Cited

U.S. PATENT DOCUMENTS

| 3,215,772 | 11/1965 | Kirara | 360/70 |
| 3,526,726 | 9/1970 | Corbett et al. | 360/109 |
| 3,585,291 | 6/1971 | Yamakawa | 360/77 |
| 3,663,764 | 5/1972 | Trost et al. | 360/70 |
| 3,787,616 | 1/1974 | Falk | 360/75 |
| 3,838,453 | 9/1974 | Buslik et al. | 360/77 |
| 4,014,040 | 3/1977 | Kornhaas | 360/77 |
| 4,044,388 | 8/1977 | Metzger | 360/77 |
| 4,056,832 | 11/1977 | de Boer et al. | 360/77 |
| 4,080,636 | 3/1978 | Ravizza | 360/77 |

FOREIGN PATENT DOCUMENTS 49-84616  8/1974  Japan.

OTHER PUBLICATIONS

IBM Tech. Disc. Bull., Price, Video Tape Recorder with Oscillating Head, vol. 12, No. 1, Jun. 1969, pp. 33-34.

Primary Examiner—Alfred H. Eddleman
Attorney, Agent, or Firm—Lewis H. Eslinger; Alvin Sinderbrand

[57] ABSTRACT

A video signal reproducing system having a magnetic head deflector for automatic head scan tracking, the deflector being displaced corresponding to an error signal obtained from crosstalk pilot signals in a reproduced video signal.

14 Claims, 68 Drawing Figures

PRIOR ART

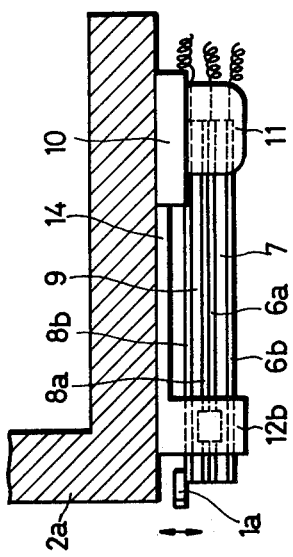
FIG.4A
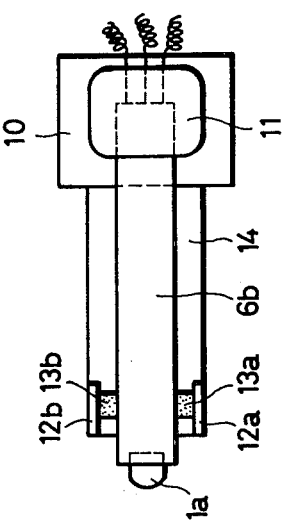
FIG.4B
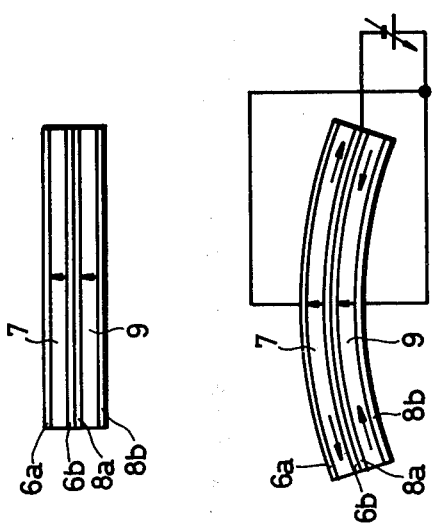
FIG.3A
FIG.3B
FIG.3C
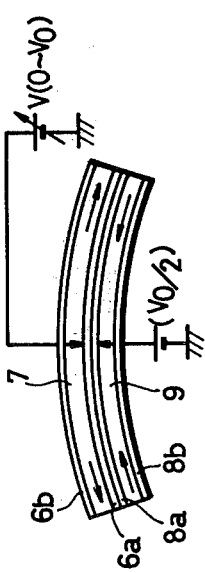

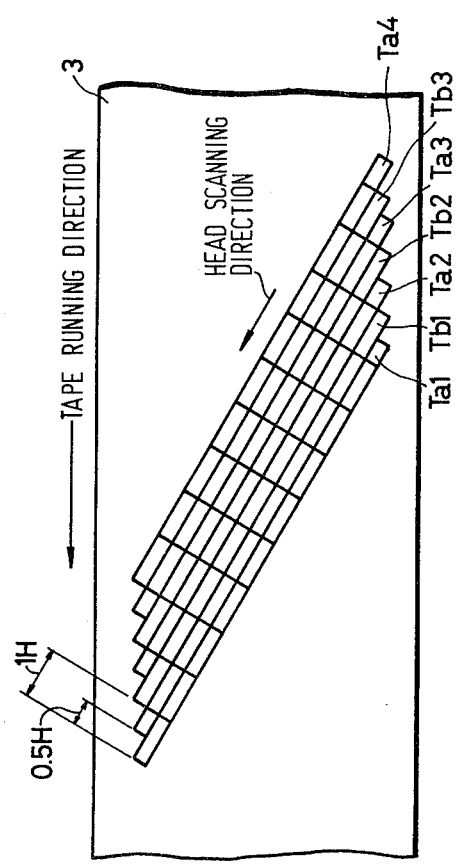

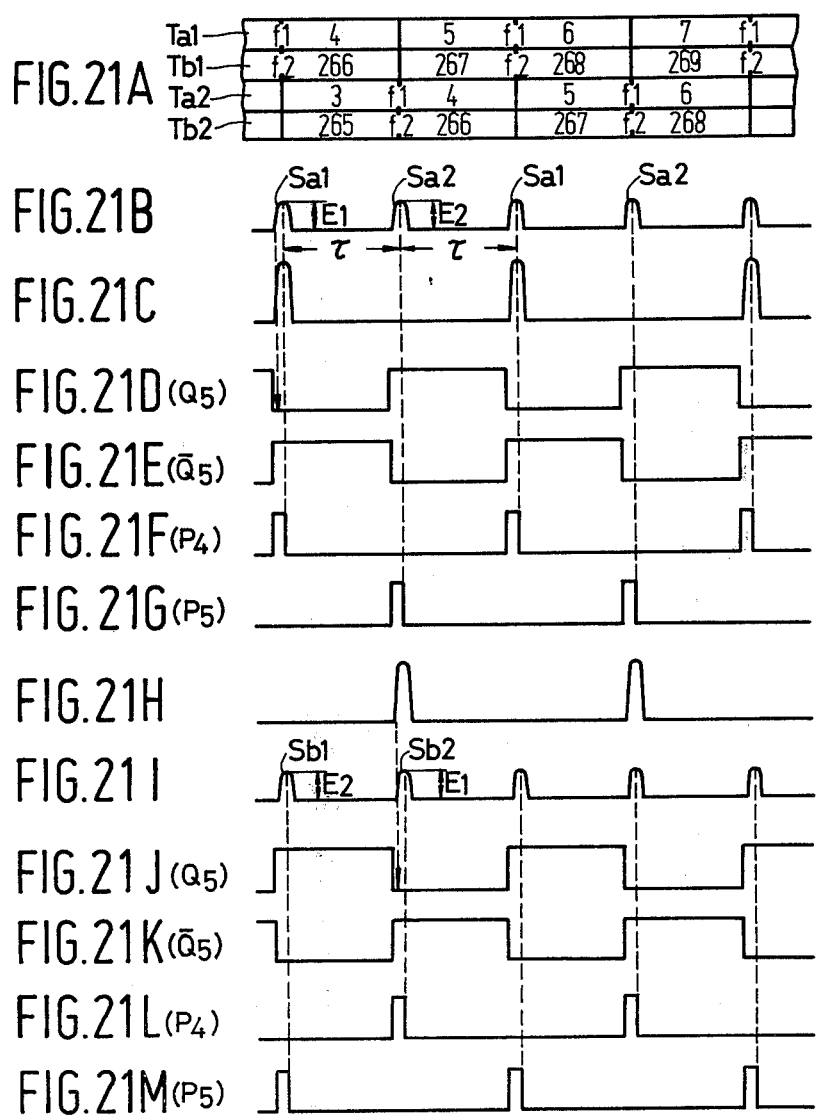

VIDEO SIGNAL RECORDING AND/OR REPRODUCING APPARATUS

BACKGROUND OF THE INVENTION

1. Field of the Invention

This invention relates to a video signal recording and/or reproducing system, and more particularly to a video signal recording and/or reproducing system available for automatic head scan tracking.

2. Description of the Prior Art

In video tape recorders (VTR), video signals are recorded on a magnetic tape in the form of a plurality of recording tracks which extend across the longitudinal direction of the tape and are arranged in parallel with one another with a predetermined unrecorded area, called the guard band between adjacent tracks.

In such VTR, the recording tracks formed by the rotary magnetic head are not always linear, and are sometimes deformed due to elongation of the tape. Accordingly, when the video signals recorded on the magnetic tape by one VTR are reproduced from the same magnetic tape by another VTR, it is difficult to made the rotary magnetic head scan the centers of the recording tracks, and there often occur some tracking errors with which the levels of the reproduced signals fluctuate, and there occurs crosstalk from the adjacent tracks. The quality of the reproduced signal is deteriorated.

For this reason, there has been proposed such a method in which the rotary magnetic head is moved by an electromechanical transducer in the direction to intersect the longitudinal direction of the tape to carry out an automatic head scan tracking. With this method, a tracking error signal is provided by deflecting intentionally, with the transducer, the magnetic head by a small amount in each direction from the track center in a sinusoidal manner so as to create a carrier amplitude modulation of a known frequency and phase. This tracking error signal is fed back to the transducer to complete a tracking servo loop. Accordingly, even if the recording tracks are curved, the reproducing head can scan the recording tracks. With this method, however, the carrier amplitude modulation is always created in a reproduced signal, so that the phase of the reproduced signal is changed thereby, and especially noticeable is the phase error in the chrominance signal caused by the phase change in the reproduced signal. Further, the apparatus for achieving the above method becomes complicated in construction.

According to the proposed method, in the VTR of the type in which video signals are recorded on the magnetic tape so that the guard band is narrow or zero in width, the crosstalk components are included in the reproduced video signals by the intentional deflection of the magnetic head. The quality of the reproduced video signals is deteriorated. Accordingly, the proposed method is not practical.

SUMMARY OF THE INVENTION

An object of this invention is to provide a video signal recording and/or reproducing system for automatic head scan tracking which does not deteriorate the reproduced signals.

Another object of this invention is to provide a video signal recording and/or reproducing system suitable for a VTR of the type in which video signals are recorded on a magnetic tape at high density.

In accordance with one aspect of this invention, a video signal recording system includes means for recording video signals containing a regularly occurring synchronizing signal, such as the horizontal synchronizing signal, on a magnetic video tape in parallel record tracks, and means for intermittently inserting at least one pilot signal into the video signals at a predetermined interval determined by the synchronizing signals in at least every other one of the tracks. The pilot signals are recorded so that pilot signals in a track being scanned and in the tracks adjacent thereto are not aligned with one another, and therefore occur at different times during the scanning of a given track.

A video signal reproducing system according to the present invention includes a transducer for scanning the record tracks to sense the recorded video signals and to reproduce those signals together with the included pilot signals, means for separating the pilot signals from the reproduced video signals, a timing circuit to sample the level of the pilot signals recorded in the tracks adjacent the track being scanned by the transducer, a comparator to compare the sampled levels from the tracks adjacent the opposite sides of the track being scanned and to provide an error signal based on the comparison of those levels, and a deflection means, such as a bi-morph leaf, for centering the scanning path of the transducer between the tracks adjacent the track being scanned. In one embodiment of the invention, a pilot signal is recorded only in every other track, and, in another embodiment, a first pilot signal of one frequency is recorded in every other track, and a second pilot signal of another frequency is recorded in the intervening or alternating tracks.

BRIEF DESCRIPTION OF THE DRAWINGS

FIG. 3A is an elevational view of a bi-morph leaf used for one embodiment of this invention;

FIG. 3B and FIG. 3C are views for explanation of operations of the bi-morph leaf of FIG. 3A supplied with electric power;

FIG. 4A is an elevational view of a bi-morph leaf assembly supporting a magnetic head;

FIG. 4B is a bottom view of the bi-morph leaf assembly of FIG. 4A;

FIG. 5 is a pattern of recorded tracks formed on a magnetic tape used for embodiments of this invention;

FIG. 21A to FIG. 21M are waveforms for explanation of operation of the system of FIG. 20.

DESCRIPTION OF THE PREFERRED EMBODIMENTS

Before the description of this invention, operation and the inherent defects of the prior art VTR will be described with reference to FIG. 1 and FIG. 2.

Figures 1A, 1B:
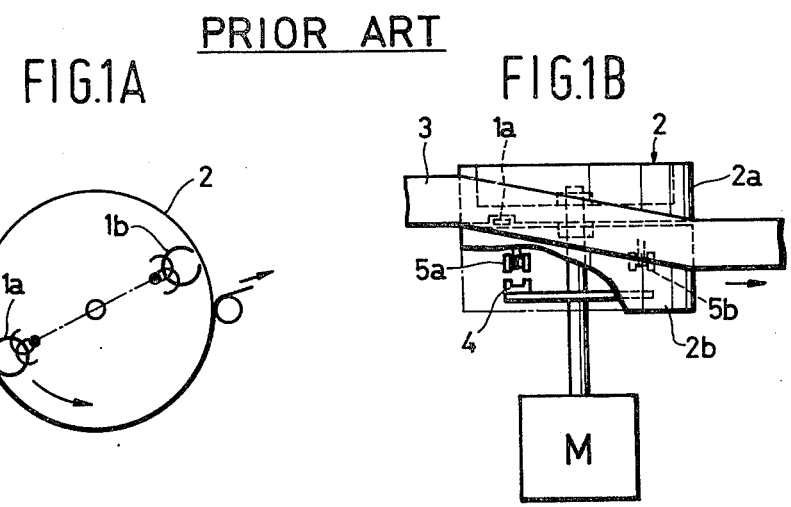
FIG. 1A is a schematic top view of a conventional rotary head recording/reproducing apparatus.
FIG. 1B is a schematic side view of the apparatus shown in FIG. 1A.

In a rotary head drum assembly of the two head helical type VTR, as shown in FIG. 1A and FIG. 1B, two magnetic meads $1a$ and $1b$ are arranged diametrically to each other in a rotatable upper drum $2a$ of a tape guide drum 2. The tape guide drum 2 consists of the rotatable upper drum $2a$ and a stationary lower drum $2b$. A magnetic tape 3 is slantly wrapped around the tape guide drum 2 over an arc of about 180°, and is transported in the direction shown by the arrows on FIG. 1A and FIG. 1B. The magnetic heads $1a$ and $1b$ are rotated in the direction shown by the arrow shown in FIG. 1A at the rate of 30 revolutions per second by an electric motor M. Further, a magnet 4 rotating with the magnetic heads $1a$ and $1b$ and stationary pick-up heads $5a$ and $5b$ opposite to the magnet 4 are arranged in the tape guide drum 2. A position detecting pulse is generated from the pick-up heads $5a$ and $5b$, in response to the rotational positions of the magnetic heads $1a$ and $1b$.

Figure 2A:
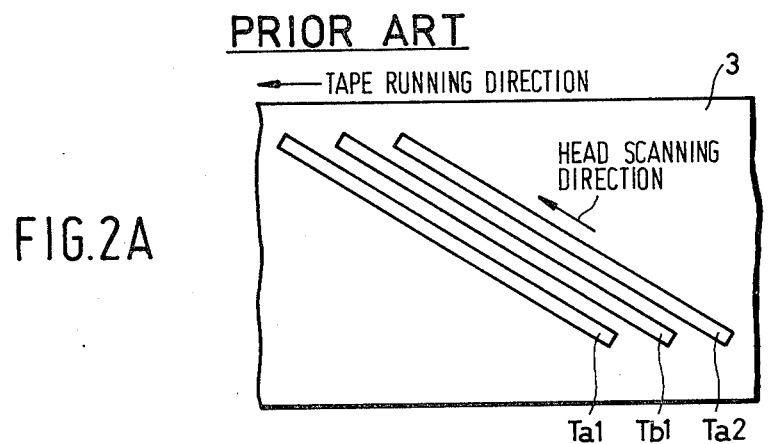
FIG. 2A and FIG. 2B are examples of recorded tracks formed on a magnetic tape.

When video signals are recorded on the magnetic tape 3, parallel slant tracks $Ta_1$, $Tb_1$, $Ta_2$ — are formed on the magnetic tape 3 alternately by the magnetic heads $1a$ and $1b$, as shown in FIG. 2A. One field of video signals is recorded on the respective track $Ta_1$, $Tb_1$, $Ta_2$ — by the magnetic head $1a$ or $1b$.

When the magnetic tape 3 is run to reproduce the signals, a tracking servo system is employed in order to make the magnetic heads $1a$ and $1b$ trace, or scan, the recorded tracks $Ta_1$, $Tb_1$, $Ta_2$, — correctly. In the tracking servo system, the relative speed between the magnetic heads $1a$ and $1b$, and the magnetic tape 3 is controlled with control signals recorded on the margin of the magnetic tape 3 and the detecting signals of the pick-up heads $5a$ and $5b$, so as to be equal to the relative speed between the magneic heads $1a$ and $1b$, and the magnetic tape 3 in the recording mode. However, even with the tracking servo system, the play-back scanning traces of the magnetic heads $1a$ and $1b$ often do not perfectly coincide with the recorded tracks $Ta_1$, $Tb_1$, $Ta_2$, —. For example, the reason, when the signals are recorded and reproduced in the different VTRs, may be that the rotational orbits of the magnetic heads $1a$ and $1b$ in the different VTRs are not equal to each other. Or the reason is that there is any error which cannot be eliminated by the tracking servo system.

When the width of the recorded track is reduced in order to increase the recording density (rows per inch) of the magnetic tape 3, or when the magnetic tape 3 is run slower for long time recording and reproducing operations than for the normal recording and reproducing operations, in the same VTR, tracking error has a severe adverse influence on reproducing characteristics such as signal-to-noise ratio (S/N).

For example, FIG. 2A shows a pattern of recorded tracks in the case when the signals are recorded on the magnetic tape at the normal tape running speed. In this case, the track pitch is 60μ, and the widths of the recorded track and guard band are 30μ, respectively.

Figure 2B:
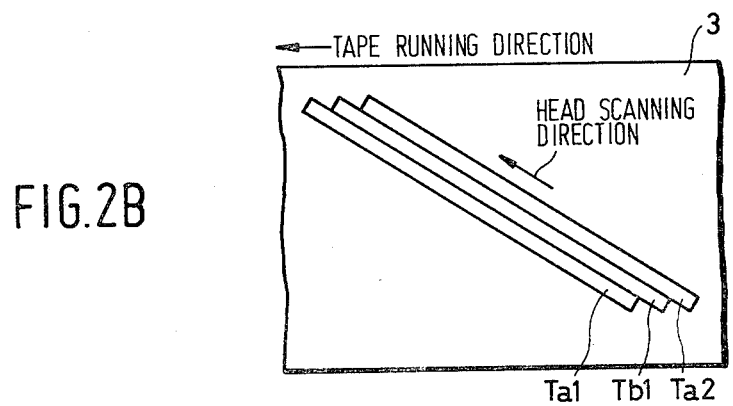

When the tape running speed of the magnetic tape is one third as high as the normal tape running speed, in the recording operation, such a pattern of recorded tracks is formed on the magnetic tape, as shown in FIG. 2B. Since the tape running speed of the magnetic tape 3 is generally very low in comparison with the relative speed between the magnetic heads $1a$ and $1b$, and the magnetic tape 3, the inclination of the recorded track at the one third tape running speed, as shown in FIG. 2B, is nearly equal to the inclination of the recorded track at the normal tape running speed, as shown in FIG. 2A. However, in the case of FIG. 2B, the track pitch is one third as wide as that in the case of FIG. 2A, namely 20μ. No guard band is formed in the pattern of FIG. 2B. In this case, it is required that the magnetic head $1a$ or $1b$, if it is the same as in the recording operation, scans exactly one recorded track and respective 5μ width portions of the adjacent recorded tracks, or that the magnetic head $1a$ or $1b$, if it is 20μ wide, scans exactly one recorded track. When the magnetic head $1a$ or $1b$ does not exactly scan the recorded track, there occurs beat interference due to cross-talk from the adjacent recorded track to deteriorate the reproduced picture.

According to this invention, such deviation of the scanning path of the magnetic head from the recorded track is detected, and the scanning path of the magnetic head is corrected in accordance with the detected deviation in the sense to eliminate the deviation.

Next, one embodiment of this invention will be described.

First, construction of a deflector for displacing the rotary magnetic head will be described with reference to FIG. 3 and FIG. 4. An electro-mechanical transducer such as piezo-electric element, piezo-ceramic element or electro-magnetic element can be used as the deflector.

In this embodiment, the rotary magnetic head is supported by a piezo-electric element. A drive signal is supplied to the piezo-electric element so as to correct the deviation of the scanning path of the magnetic head.

FIG. 3A shows one example of a bi-morph leaf as the piezo-electric element. The bi-morph leaf includes a pair of plate-like piezo-electric materials 7 and 9. Electrodes $6a$ and $6b$, and $8a$ and $8b$ are plated on both surfaces of the piezo-electric materials 7 and 9, respectively. The electrodes $6b$ and $8a$ contact with each other, so that the directions of the polarizations of the piezo-electric materials 7 and 9 are the same as each other, as shown by the arrows on FIG. 3A.

When electric field is applied to the above-described bi-morph leaf in the manner shown on FIG. 3B, the piezo-electric material 7 is elongated, while the piezo-electric material 9 is shortened, in the lengthwise directions as shown by a arrows on FIG. 3B. As the result, the bi-morph leaf bends as shown on FIG. 3B. The bending displacement depends on the strength of the applied electric field. When the reverse electric field is applied to the bi-morph leaf, the latter bends in the reverse direction.

FIG. 3C shows the case that the electrode 6a contacts with the electrode 8a so that the direction of the polarization of the piezo-electric material 7 is opposite to the direction of the polarization of the piezo-electric material 9. No voltage is applied to the mated electrodes 6a and 8a, while a bias voltage Vo/2 is applied to the electrode 8b, and a variable (0 to Vo) drive voltage V is applied to the electrode 6b. When the drive voltage V is lower than the bias voltage Vo/2, the bi-morph leaf bends downwardly, as shown on FIG. 3C. When the drive voltage V is higher than the bias voltage Vo/2, the bi-morph leaf bends upwardly.

FIG. 4A and FIG. 4B show a bi-morph leaf assembly supporting a magnetic head. As shown on FIG. 4A and FIG. 4B, a mounting base 10 is fixed to the lower surface of the upper head drum 2a. The base end of the bi-morph leaf is fixed to the mounting base 10 by adhesive 11. The leaf is so arranged that the surfaces of the piezo-electric mateials 7 and 9 are parallel with the lower surface of the upper head drum 2a. The magnetic head 1a or 1b is attached to the free end of the leaf. The lengthwise direction of the air gap of the head 1a or 1b is perpendicular to the surfaces of the materials 7 and 9. And the surfaces of the materials 7 and 9 are substantially perpendicular to the rotational shaft of the upper head drum 2a.

Damper members 13a and 13b such as rubber are provided for damping free oscillation due to the bending force applied to the piezo-electric leaf. The damper members 13a and 13b are attached to a pair of tabs 12a and 12b fixed to one end of a damper mounting plate 14 which is fixed to the lower surface of the upper head drum 2a. The damper mounting plates 14 extend toward the periphery of the upper head drum 2a from the outward side of the mounting base 10. The damper members 13a and 13b are pressed between the sides of the bi-morph leaf and the tabs 12a and 12b, respectively. Lead wires are connected to the electrodes of the bi-morph leaf. When a certain voltage is applied to the lead wires in the manner as shown on FIG. 3C, the bi-morph bends downwardly or upwardly to move the magnetic head 1a or 1b in the direction substantially perpendicular to the rotational orbit of the magnetic head 1a or 1b, as shown by the arrow on FIG. 4A.

Neither the drive voltage nor the bias voltage is applied to the lead wires of the bi-morph leaf in the recording mode of the VTR. Video signals are recorded on the magnetic tape to form the tracks. When the signals are reproduced from the magnetic tape 3, the bias voltage and a drive voltage as hereinafter described are supplied to the bi-morph leaf to bend the latter so as to compensate for tracking errors.

One embodiment of this invention is applied to the VTR of the type in which video signals are recorded on the magnetic tape 3 in such a manner that the record positions of the horizontal synchronizing signals of the video signals, which are represented by the solid lines perpendicular to the longitudenal directions of the recorded tracks $Ta_1$, $Tb_1$, $Ta_2$, — in FIG. 5, are aligned with each other on the adjacent recorded tracks $Ta_1$, $Tb_1$, $Ta_2$, — as shown in FIG. 5. Such recording manner requires that the distance between the terminal ends of the adjacent tracks is (n−1/2)-times as long as the distance of 0.5H, where H represents the distance on the magnetic tape 3 corresponding to the time of one horizontal scanning section, and n is an integer.

When the video signals are recorded on the magnetic tape running at the speed one third as high as the normal running speed at which the distance between the terminal ends of the adjacent tracks is as long as 1.5H and the record positions of the horizontal synchronizing signals are aligned with each other on the adjacent tracks, the record positions of the horizontal synchronizing signals are similarly aligned with each other, and the distance between the terminal ends of the adjacent tracks is as long as 0.5H. Such recording manner is disclosed in the U.S. Pat. No. 3,215,772, issued on Nov. 2, 1965, assigned to the same assignee as the assignee of this invention.

Figure 6:
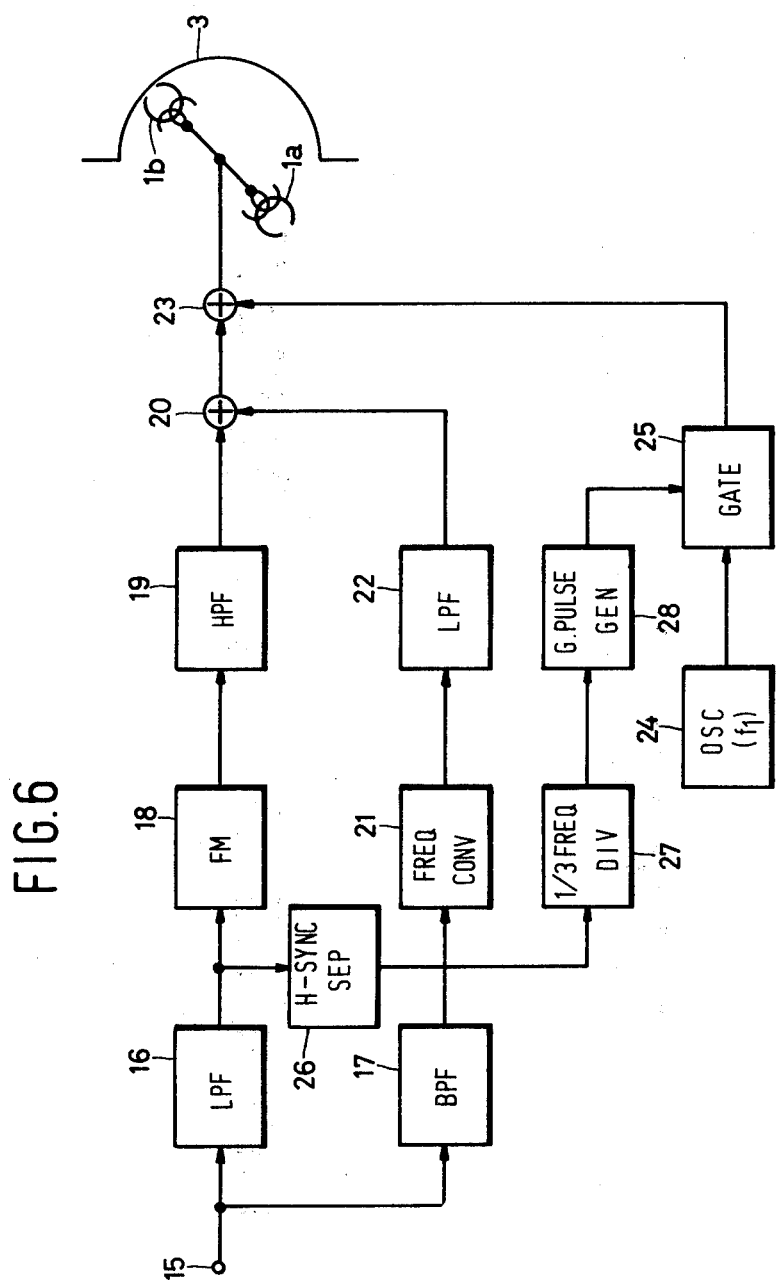
FIG. 6 is a block diagram of a recording system according to one embodiment of this invention.

FIG. 6 shows a recording system according to one embodiment of this invention. In FIG. 6, a composite color video signal such as a NTSC color signal is applied to an input terminal 15, and it is supplied to a low pass filter 16 and to a band pass filter 17. A luminance signal separated at the low pass filter 16 is supplied to a frequency modulator 18. The FM output of the frequency modulator 18 is supplied to a high pass filter 19. Undesirable signal components are eliminated from the output of the frequency modulator 18 at the high pass filter 19. The output of the high pass filter 19 is supplied to an adder 20.

A chrominance signal from the band pass filter 17 is supplied to a frequency converter 21. The output of the frequency converter 21 is supplied through a low pass filter 22 to the adder 20. The frequency of the chrominance signal is changed to a down-converted carrier frequency. The frequency-modulated luminance signal and the down-converted chrominance signal are mixed with each other at the adder 20. The frequency of the output of the adder 20 is multiplex. In the usual VTR, the output of the adder 20 is supplied through a not-shown recording amplifier to the magnetic heads 1a and 1b, to be recorded on the magnetic tape 3. According to this embodiment, a pilot signal is further mixed with the output of the adder 20 at another adder 23.

In FIG. 6, a continuous wave of a fixed frequency $f_1$ and a fixed amplitude is generated at an oscillator 24, and it is supplied to a gate circuit 25. The output of the gate circuit 25 as the pilot signal is supplied to the adder 23 and mixed with the record signal thereat.

Figure 7A:
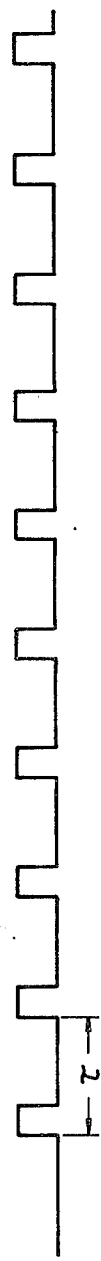
FIG. 7A to FIG. 7C are waveforms for explanation of operation of the system of FIG. 6.
Figure 7B:
Figure 7C:

The video signal from the low pass filter 16 is supplied to a horizontal synchronizing separator 26. A horizontal synchronizing signal as shown in FIG. 7A is separated at the horizontal synchronizing separator 26. The frequency of the horizontal synchronizing signal is divided into one third (⅓), as shown in FIG. 7B. The period of the frequency-divided horizontal synchronizing signal is $3\tau$, where $\tau$ represents one horizontal period of the horizontal synchronizing signal, as shown in FIG. 7A. The output of the frequency divider 27 is supplied to a gate pulse generator 28. The gate pulse from the gate pulse generator 28 is supplied to the gate circuit 25. The pilot signal of the fixed frequency and fixed amplitude is obtained from the gate circuit 25 in synchronization with the frequency-divided horizontal synchronizing signal, as shown in FIG. 7C. The frequency $f_1$ of the pilot signal is so selected as to be at the lower side of the frequency band of the frequency-modulated luminance signal.

Figure 8:
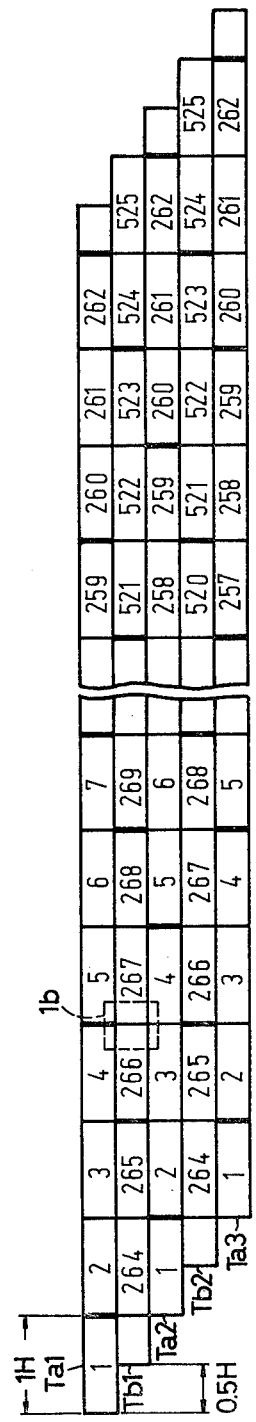
FIG. 8 is an enlarged plan view of a part of the recorded tracks according to the one embodiment of this invention.

According to the above-described recording system, the record positions of the pilot signals, which are represented by the thick solid lines perpendicular to the longitudinal directions of the recorded tracks $Ta_1$, $Tb_1$, $Ta_2$, $Tb_2$ — in FIG. 8, are shifted from each other on the adjacent recorded tracks $Ta_1$, $Tb_1$, $Ta_2$, $Tb_2$ — in such a manner as enlargedly shown in FIG. 8. Numerals 1 to 525 on the recorded tracks $Ta_1$, $Tb_1$, $Ta_2$, $Tb_2$ — represent the order of the horizontal trace periods in the respective frames of the video signals.

Figure 9:
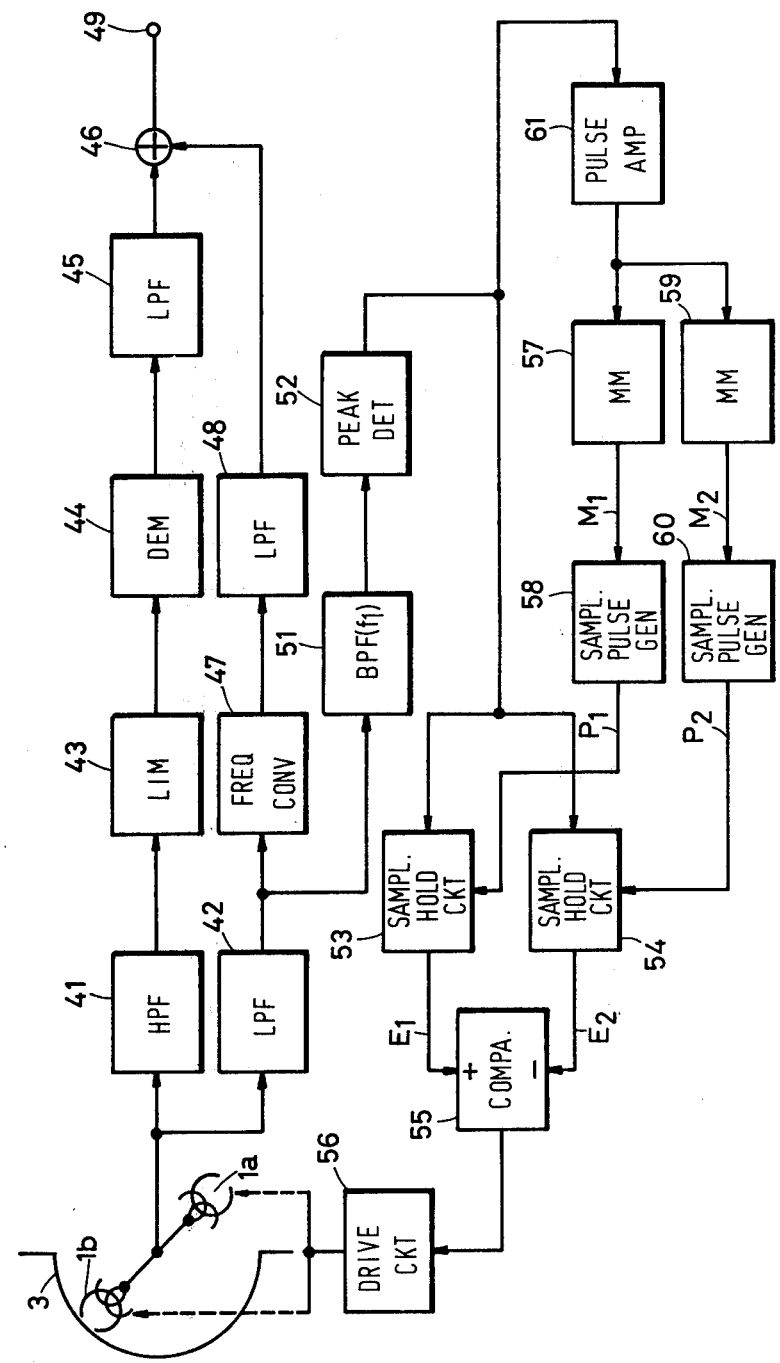
FIG. 9 is a block diagram of a reproducing system according to the one embodiment of this invention.

FIG. 9 shows a reproducing system according to one embodiment of this invention. In FIG. 9, the reproduced RF signals from the magnetic heads $1a$ and $1b$ are supplied to a high pass filter 41 and a low pass filter 42. The frequency-modulated luminance signal is obtained from the high pass filter 41, and supplied through a limiter 43 to an FM demodulator 44. The output of the FM demodulator 44 is supplied to a low pass filter 45. The luminance signal is obtained from the low pass filter 45, and is supplied to an adder 46.

The down-converted chrominance signal and the pilot signal are obtained from the low pass filter 42, and supplied to a frequency converter 47. The output of the frequency converter 47 is supplied to a low pass filter 48. The chrominance signal is obtained from the low pass filter 48, and is supplied to the adder 46. The composite color video signal is obtained from an output terminal 49 of the adder 46.

The output of the low pass filter 42 is further supplied to a band pass filter 51 tuning with the frequency $f_1$. The output of the band pass filter 51 is supplied to a peak detector circuit 52. The detecting output of the peak detector circuit 52 is supplied to sampling hold circuit 53 and 54. Outputs $E_1$ and $E_2$ of the sampling hold circuits 53 and 54 are applied to a comparator 55 which is constructed, for example, as a differential amplifier. The comparating output $(E_1 - E_2)$ is obtained as the error signal from the comparator 55. The error signal is supplied as a drive voltage through a drive circuit 56 to the bimorph leaf assemblies supporting the magnetic heads $1a$ and $1b$.

A sampling pulse $P_1$ is supplied to the one sampling hold circuit 53. The sampling pulse $P_1$ is formed in a sampling pulse generator 58 with an output pulse $M_1$ of a monostable multivibrator 57. The time constant of the monostable multivibrator 57 is slightly smaller than horizontal period $\tau$. Another sampling pulse $P_2$ is supplied to the other sampling hold circuit 54. The sampling pulse $P_2$ is formed in a sampling pulse generator 60 with an output pulse $M_2$ of a monostable multivibrator 59. The time constant of the monostable multivibrator 59 is slightly smaller than $2\tau$. The monostable multivibrators 57 and 59 are triggered with the output of a pulse amplifier 61 functioning as a kind of clipper. The detecting output of the peak detector circuit 52 is supplied to the pulse amplifier 61.

Figure 10:
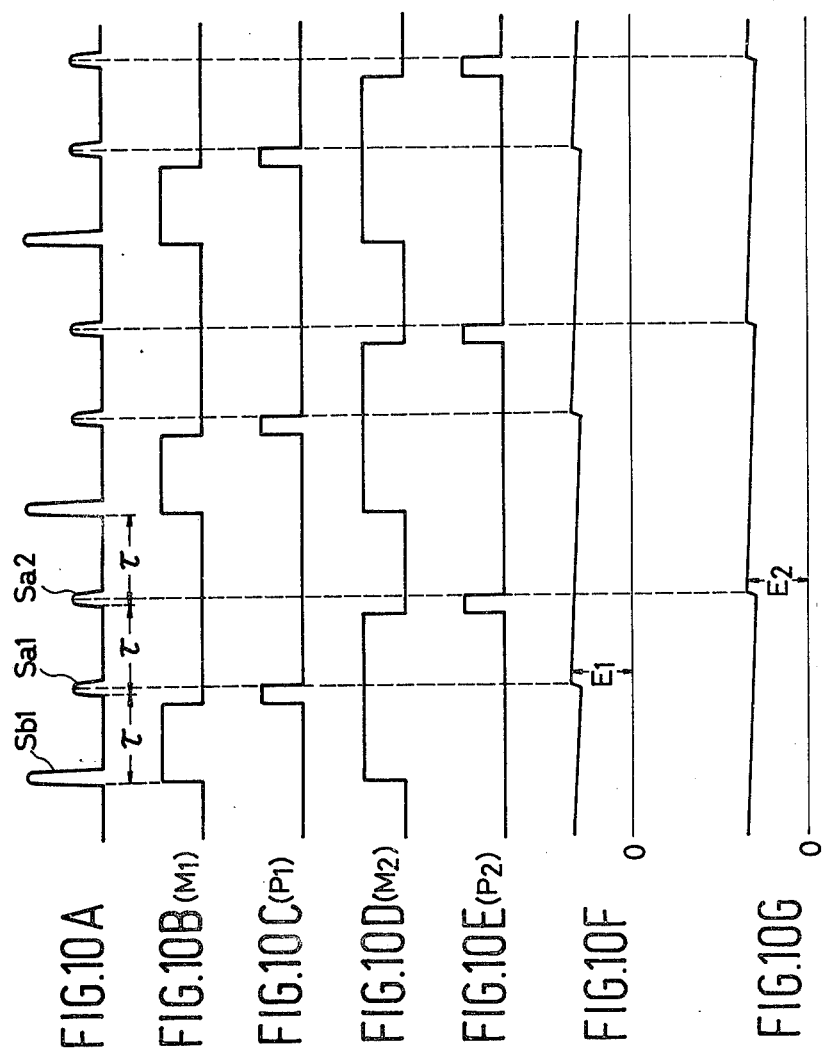
FIG. 10A to FIG. 10G are wave forms for explanation of operation of the reproducing system of FIG. 9.

The tracking width of the magnetic head $1a$ or $1b$ shown by the dotted line in FIG. 8, is one and a half times as large as the track pitch. In the correct tracking of the magnetic head, the portions of the adjacent tracks $Ta_1$ and $Ta_2$ on which the magnetic head overlaps, are equal in width, as shown in FIG. 8. When the magnetic head $1b$ scans the recorded track $Tb_1$ in the manner shown in FIG. 8, a series of the pilot signal components shown in FIG. 10A is obtained as the detecting output from the peak detector circuit 52. In FIG. 10A, $Sb_1$ represents the detecting output of the pilot signal reproduced from the recorded track $Tb_1$, $Sa_1$ the detecting output of the pilot signal as the crosstalk component reproduced from the adjacent recorded track $Ta_1$, delayed from the detecting output $Sb_1$ by the time $\tau$, and $Sa_2$ the detecting output of the pilot signal as the crosstalk component reproduced from the adjacent recorded track $Ta_2$, delayed from the detecting output $Sa_1$ by the time $\tau$. The detecting output $Sb_1$ is again obtained from the peak detector circuit 52, delayed from the detecting output $Sa_2$ by the time $\tau$. In such an order, the detecting output $Sb_1$ of the pilot signal from the recorded track $Tb_1$ to be scanned, the detecting output $Sa_1$ of the pilot signal as the crosstalk component from the adjacent recorded track $Ta_1$, and the detecting output $Sa_2$ of the pilot signal as the crosstalk component from the adjacent recorded track $Ta_2$ are obtained from the peak detector circuit 52.

The highest detecting output $Sb_1$ from the peak detector circuit 52 is waveform-shaped in the pulse amplifier 61. The shaped output pulse from the pulse amplifier 61 is applied to the monostable multivibrator 57 to trigger the latter. The pulse $M_1$ as shown in FIG. 10B is obtained from the monostable multivibrator 57. The pulse width of the pulse $M_1$ is slightly smaller than the time $\tau$. The pulse $M_2$ as shown in FIG. 10D is obtained from the monostable multivibrator 59. The pulse width of the pulse $M_2$ is slightly smaller than the time $2\tau$. The sampling pulses $P_1$ and $P_2$ as shown in FIG. 10C and FIG. 10E are formed in the sampling pulse generators 58 and 60 with the trailing edges of the pulses $M_1$ and $M_2$. The detecting outputs of the peak detector circuit 52 are sampled with the trailing edges of the sampling pulses $P_1$ and $P_2$. The sampling output $E_1$ as shown in FIG. 10F is obtained from the sampling hold circuit 53, while the sampling output $E_2$ as shown in FIG. 10G is obtained from the sampling hold circuit 54. The sampling outputs $E_1$ and $E_2$ are supplied to the comparator 55. The comparison output $(E_1 - E_2)$ is supplied as the error signal from the comparator 55 to the drive circuit 56.

When the magnetic head $1b$ shown by the dotted line in FIG. 8 scans the recorded track $Tb_1$ along the correct tracking path, the comparison output $(E_1 - E_2)$ is nearly equal to zero $(E_1 - E_2 \approx 0)$. The drive voltage equal to the bias voltage is applied to the bi-morph leaf assembly supporting the magnetic head $1b$ from the drive circuit 56. The tracking path of the magnetic head $1b$ is not changed. When the magnetic head $1b$ deviates toward the adjacent recorded track $Ta_1$ from the correct tracking path, the detecting output of the pilot signal as the crosstalk component from the adjacent recorded track $Ta_1$ becomes higher than the detecting output of the pilot signal as the crosstalk component from the adjacent recorded track $Ta_2$. As the result, the comparison output $(E_1 - E_2 = \Delta E)$ is generated from the comparator 55. The magnetic head $1b$ supported by the bi-morph leaf assembly is so deflected with the comparison output $\Delta E$ as to scan the recorded track $Tb_1$ along the correct tracking path. Reversely, when the magnetic head $1b$ deviates toward the adjacent recorded track $Ta_2$ from the correct tracking path, the detecting output of the pilot signal as the crosstalk component from the adjacent recorded track $Ta_1$ becomes lower than the detecting output of the pilot signal as the crosstalk component from the adjacent recorded track $Ta_2$. As the result, the comparison output $(E_1 - E_2 = -\Delta E)$ is generated from the comparator 55. The magnetic head $1b$ supported by the bi-morph leaf assembly is so deflected with the comparison output $(-\Delta E)$ as to scan the recorded track $Tb_1$ along the correct tracking path.

When the magnetic head $1a$ scans the recorded track $Ta_2$, the gate pulses $P_1$ and $P_2$ are generated from the sampling pulse generators 58 and 60 with reference to the detecting output of the pilot signal reproduced from the recorded track $Ta_2$. The sampled detecting output $E_1$ of the pilot signal as the crosstalk component from the adjacent recorded track $Tb_1$ is compared with the sampled detecting output $E_2$ of the pilot signal as the crosstalk component from the adjacent recorded track $Tb_2$. The comparison output $(E_1 - E_2)$ of the comparator 55 is supplied through the drive circuit 56 to the bi-morph leaf assembly supporting the magnetic head $1a$ so as to make the magnetic head $1a$ scan the recorded track $Ta_2$ along the correct tracking path.

A single frequency pilot signal of the frequency $f_1$ is used for the above-described embodiment. Accordingly, when the tracking error is too large, there is the fear that the pilot signal from the recorded track to be scanned cannot be detected or discriminated by the peak detector circuit 52. In order to avoid the above-described fear, there may be provided another pilot signal oscillator generating a continuous wave of another fixed frequency $f_2$. The one pilot signal of the frequency $f_1$ is recorded on the tracks $Ta_1$, $Ta_2$, —, while the other pilot signal of the frequency $f_2$ is recorded on the tracks $Tb_1$, $Tb_2$, —, in the same positional relationship as in FIG. 8. The pilot signals of the frequencies $f_1$ and $f_2$ are passed through band pass filters, respectively. The crosstalk components from the adjacent recorded tracks can be detected or descriminated by the respective peak detector circuits. Thus, the above-described disadvantage can be removed.

Figure 11:
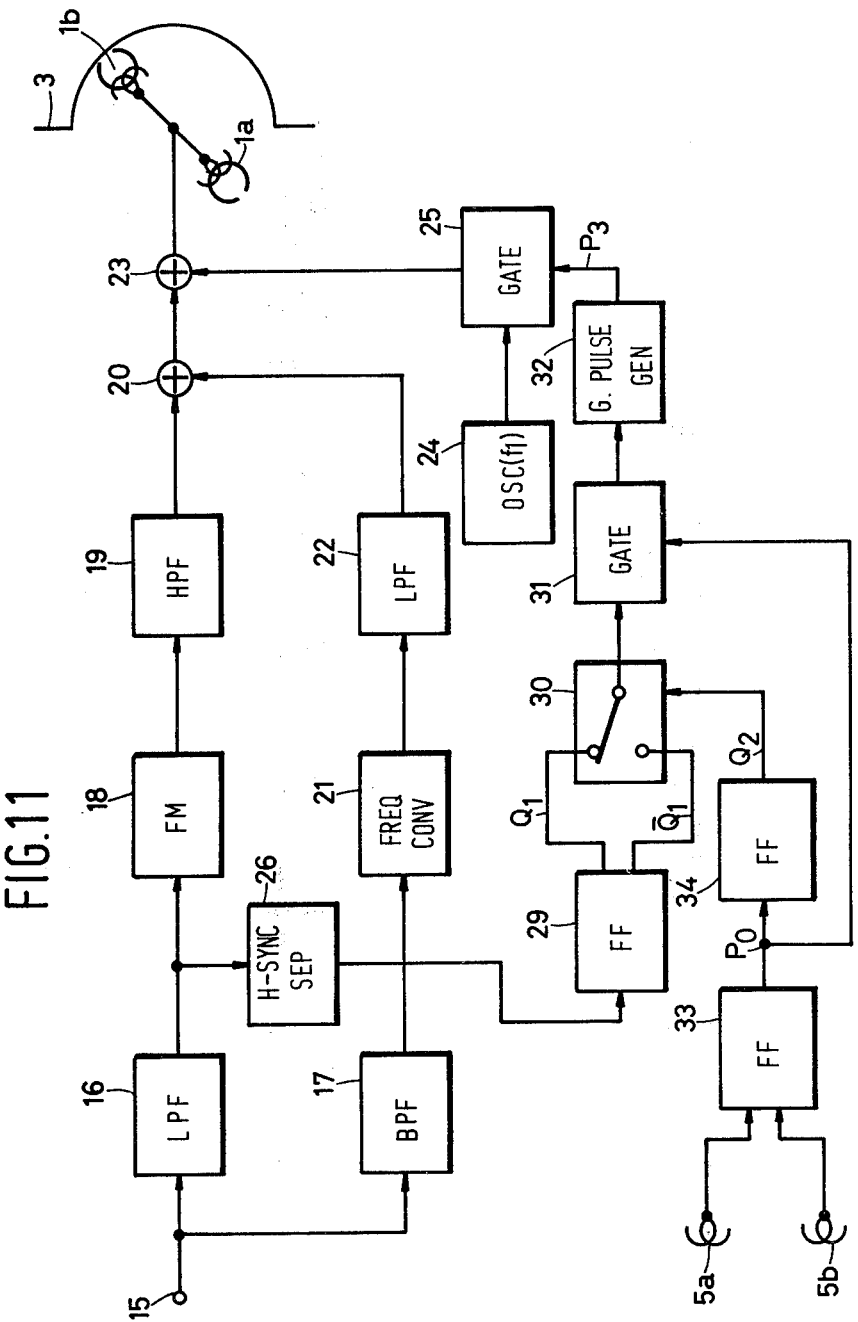
FIG. 11 is a block diagram of a recording system according to another embodiment of this invention.

FIG. 11 shows a recording system according to another embodiment of this invention. Parts in this embodiment which correspond to the parts in the first embodiment (FIG. 6), are denoted by the same reference numerals.

In FIG. 11, the composite color video signal is applied to the input terminal 15, and supplied to the low pass filter 16 and to the band pass filter 17, as in the first embodiment. The output of the low pass filter 16 is supplied to the horizontal synchronizing separator 26 to separate the horizontal synchronizing signal. In this embodiment, the horizontal synchronizing signal from the horizontal synchronizing separator 26 is supplied to a flip-flop 29. The outputs $Q_1$ and $\overline{Q}_1$ of the flip-flop 29 are alternatively selected by a switching circuit 30, and supplied through a gate circuit 31 to a gate pulse generator 32. The output of the oscillator 24 is passed through a gate circuit 25 with a gate pulse $P_3$ obtained from the gate pulse generator 32.

The position detecting pulses from the pickup heads $5a$ and $5b$ are supplied through not-shown amplifier and monostable multivibrator to a flip-flop 33. A head change-over pulse $P_0$ is generated from the flip-flop 33. When the magnetic head $1a$ scans the magnetic tape 3, the head change-over pulse $P_0$ is put into a high level. And when the magnetic tape $1b$ scans the magnetic tape 3, the head change-over pulse $P_0$ is put into a low level. The head change-over pulse $P_0$ is supplied to the gate circuit 31 and a flip-flop 34. A switching pulse $Q_2$ is obtained from the flip-flop 34, and supplied to the switching circuit 30. The frequency of the switching pulse $Q_2$ is half of the frequency of the head change-over pulse $P_0$. The level of the switching pulse $Q_2$ is inverted at the period of one frame.

Figure 12:
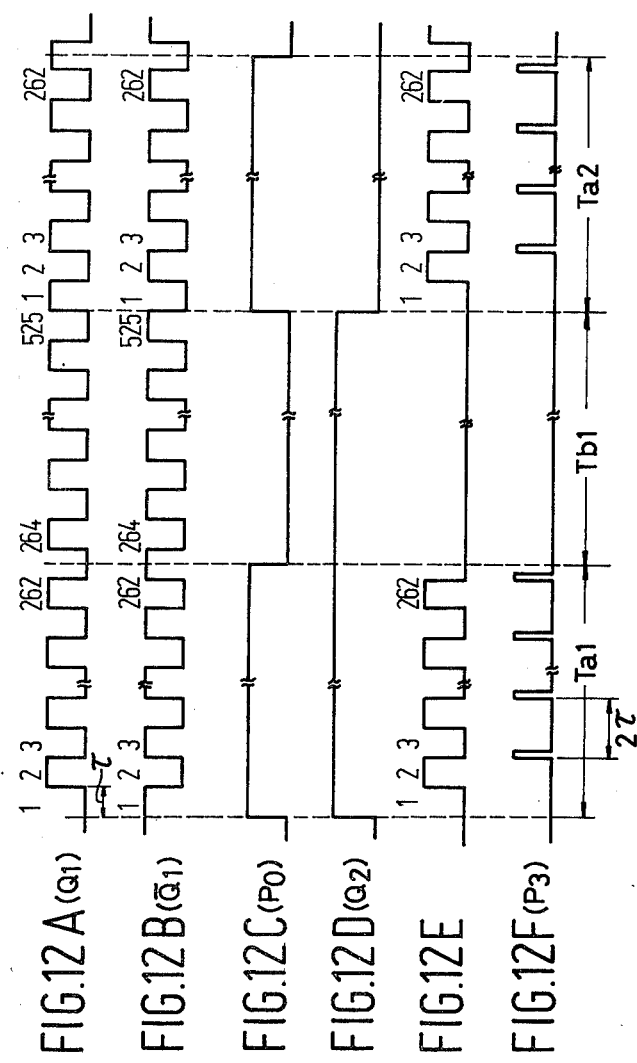
FIG. 12A to FIG. 12F are waveforms for explanation of operation of the recording system of FIG. 11.

The output $Q_1$ of the flip-flop 29 is shown in FIG. 12A. The level of the output $Q_1$ is inverted at the horizontal period $\tau$. The other output $\overline{Q}_1$ of the flip-flop 29 is shown in FIG. 12B. The head change-over pulse $P_0$ is shown in FIG. 12C. The level of the pulse $P_0$ is inverted at the period of one field. The switching pulse $Q_2$ from the flip-flop 34 is shown in FIG. 12D. When the switching pulse $Q_2$ is put at the higher level, the pulse $Q_1$ is supplied to the gate circuit 31 through the switching circuit 30. And when the switching pulse $Q_2$ is put at the low level, the pulse $\overline{Q}_1$ is supplied to the gate circuit 31 through the switching circuit 30. The gate circuit 31 turns on with the high level of the head change-over pulse $P_0$. And it turns off with the low level of the head change-over pulse $P_0$. As the result, pulses of the width $\tau$ are generated from the gate circuit 31, as shown in FIG. 12E, for each field that the magnetic head $1a$ scans the magnetic tape 3 for forming the tracks $Ta_1$, $Ta_2$, —. Gate pulses $P_3$ are generated at the period of $2\tau$ with the trailing edges of the output pulses of the gate circuit 31 by the gate pulse generator 32, as shown in FIG. 12F. The gate circuit 25 turns on with the gate pulses $P_3$, to pass the output of the oscillator 24. Thus, the pilot signal of the frequency $f_1$ from the gate circuit 25 is mixed with the record signal from the adder 20, at the adder 23.

Figure 13:
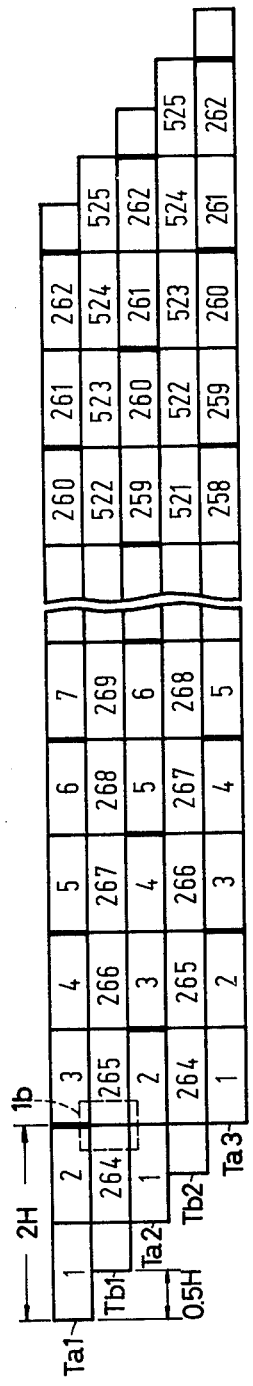
FIG. 13 is an enlarged plan view of a part of the recorded tracks according to the other embodiment of this invention.

According to the recording system of FIG. 11, the pilot signal of the frequency $f_1$ is recorded at the period of 2H on the tracks $Ta_1$, $Ta_2$, — formed by the magnetic head $1a$, as enlargedly shown in FIG. 13. The record positions of the pilot signal are shown by the thick solid lines in FIG. 13. The record positions of the pilot signal on the tracks $Ta_1$ and $Ta_2$ adjacent to the track $Tb_1$, the tracks $Ta_2$ and $Ta_3$ adjacent to the track $Tb_2$, — are shifted from each other by one horizontal trace period H.

Figure 14:
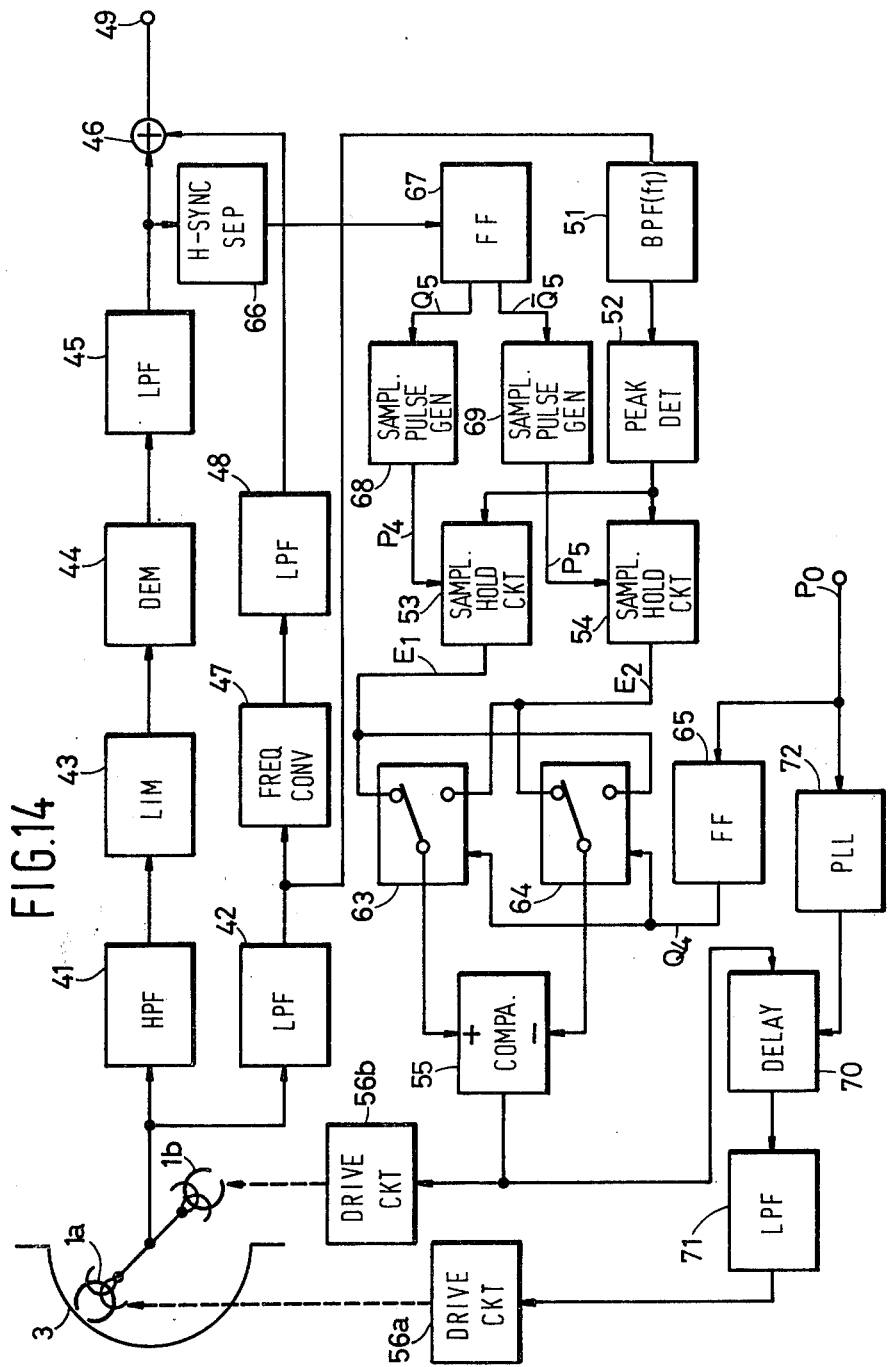
FIG. 14 is a block diagram of a reproducing system according to the other embodiment of this invention.

FIG. 14 shows a reproducing system according to another embodiment of this invention. Parts in this embodiment which correspond to the parts in the first embodiment of FIG. 9, are denoted by the same reference numerals.

In FIG. 14, the reproduced RF signals from the magnetic heads $1a$ and $1b$ are supplied to the high pass filter 41 and the low pass filter 42. The frequency-modulated luminance signal is obtained from the high pass filter 41, and supplied through the limitter 43 to the FM demodulator 44. The output of the FM demodulator 44 is supplied to the low pass filter 45. The luminance signal is obtained from the low pass filter 45, and is supplied to the adder 46.

The down-converted chrominance signal and the pilot signal are obtained from the low pass filter 42, and supplied to the frequency converter 47. The output of the frequency converter 47 is supplied to the low pass filter 48. The chrominance signal is obtained from the low pass filter 48, and is supplied to the adder 46. The composite color video signal is obtained from the output terminal 49 of the adder 46.

The output of the low pass filter 42 is further supplied to the band pass filter 51 tuning with the frequency $f_1$. The output of the band pass filter 51 is supplied to the peak detector circuit 52. The detecting output of the peak detector circuit 52 is supplied to the sampling hold circuits 53 and 54. Outputs $E_1$ and $E_2$ of the sampling hold circuits 53 and 54 are applied through switching circuits 63 and 64 to the comparator 55 which is constructed, for example, as a differential amplifier. The comparison output is obtained as the error signal from the comparator 55. The error signal is supplied as a drive voltage through a drive circuit 56b to the bi-morph leaf assembly supporting the magnetic head 1b.

Figure 15:
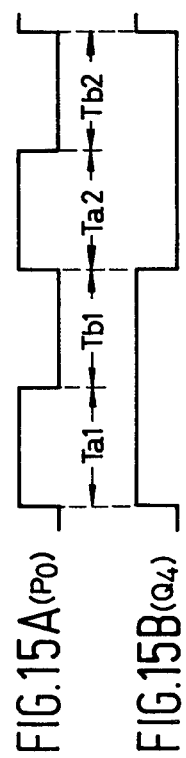
FIG. 15A and FIG. 15B, and FIG. 16A to FIG. 16L are waveforms for explanation of operation of the reproducing system of FIG. 14.

The switching circuits 63 and 64 are changed over with the application of a switching pulse $Q_4$ from a flip-flop 65 which is triggered with the head change-over pulse $P_0$ formed from the outputs of the pickup heads 5a and 5b, as shown in FIG. 15A. The level of the switching pulse $Q_4$ as shown in FIG. 15B is inverted at the period of one frame. When the switching pulse $Q_4$ is at the high level, namely, when the magnetic heads 1a and 1b scan the tracks $Ta_1$ and $Tb_1$, the switching circuits 63 and 64 are connected at one stationary terminals, as shown in FIG. 14, and the comparison output $(E_1 - E_2)$ is obtained from the comparator 55. And when the switching pulse $Q_4$ is at the low level, namely when the magnetic heads 1a and 1b scan the tracks $Ta_2$ and $Tb_2$, the switching circuits 63 and 64 are connected at other stationary terminals, and the comparison output $(E_2 - E_1)$ is obtained from the comparator 55.

The output of the low pass filter 45 is applied to a horizontal synchronizing separator 66. A flip-flop 67 is triggered with the horizontal synchronizing signal separated at the horizontal synchronizing separator 66. Output pulses $Q_5$ and $\overline{Q_5}$ of the flip-flop 67 are supplied to sampling pulse generators 68 and 69. Sampling pulses $P_4$ and $P_5$ synchronized with the leading edges of the output pulses $Q_5$ and $\overline{Q_5}$ are generated from the sampling pulse generators 68 and 69, respectively. The sampling pulses $P_4$ and $P_5$ are supplied to the sampling hold circuit 53 and 54. The detecting outputs of the peak detector circuit 52, namely the pilot signals as the crosstalk components are sampled and held at the sampling hold circuits 53 and 54 with the sampling pulses $P_4$ and $P_5$.

The output of the comparator 55 is further supplied through a one field delay circuit 70 which is, for example, constructed as an electric-charge transfer element, and through a low pass filter 71, to a drive circuit 56a. The drive voltage from the drive circuit 56a is supplied to the bi-morph leaf assembly supporting the magnetic head 1a. Clock pulses synchronized with the head change-over pulses $P_0$ are supplied to the one-field delay circuit 70 from a PLL circuit 72.

Next, there will be described the operation of the reproducing system of FIG. 14 when magnetic head 1b shown by the dotted line in FIG. 13 scans the tracks $Tb_1$. Corresponding to the scanning positions on the tracks $Tb_1$ as shown in FIG. 16A, the detecting output $Sa_1$ of the pilot signal as the crosstalk component from the adjacent track $Ta_1$, and the detecting output $Sa_2$ of the pilot signal as the crosstalk component from the adjacent track $Ta_2$ are alternately generated at the period of $\tau$ from the peak detector circuit 52, as shown in FIG. 16B.

Figure 16:
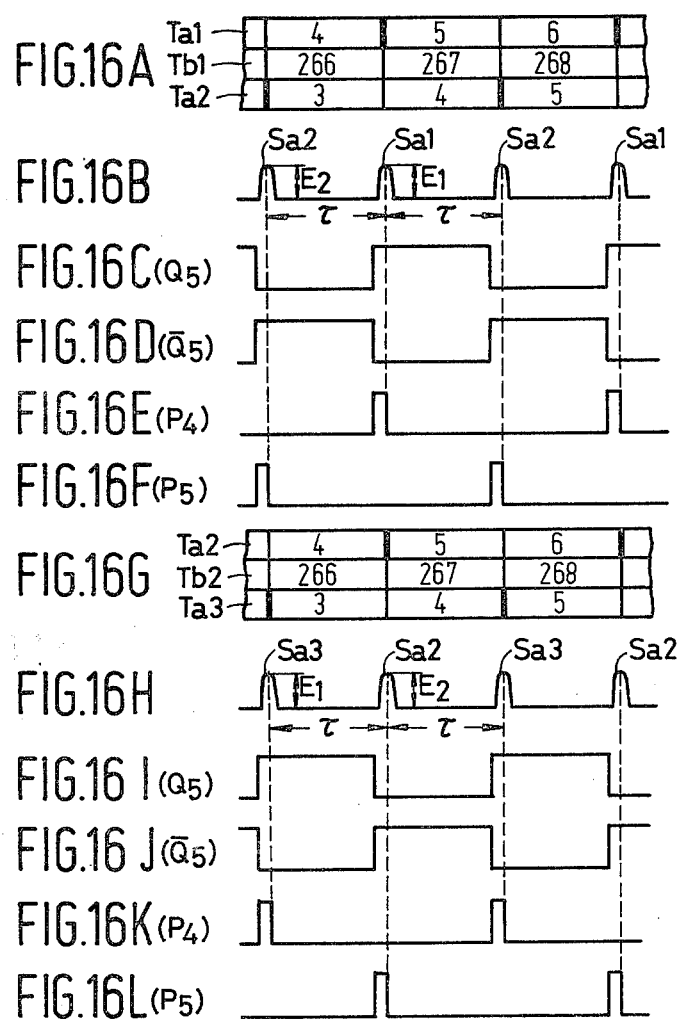

The pulses $Q_5$ and $\overline{Q_5}$ in opposite phases to each other are generated from the flip-flop 67, as shown in FIG. 16C and FIG. 16D. The levels of the pulses $Q_5$ and $\overline{Q_5}$ are inverted at the period of $\tau$. The sampling pulses $P_4$ and $P_5$ shown in FIG. 16E and FIG. 16F are generated from the sampling pulse generators 68 and 69. The detecting output $Sa_1$ of the pilot signal as the crosstalk component from the adjacent track $Ta_1$ is sampled with the sampling pulse $P_4$. The sampling output of the level of $E_1$ is obtained from the sampling hold circuit 53. The detecting output $Sa_2$ of the pilot signal as the crosstalk component from the adjacent track $Ta_2$ is sampled with the sampling pulse $P_5$. The sampling output of the level of $E_2$ is obtained from the sampling hold circuit 54. Accordingly, the comparison output $(E_1 - E_2)$ is generated from the comparator 55, and supplied through the drive circuit 56b to the bi-morph leaf assembly supporting the magnetic head 1b. The comparison output $(E_1 - E_2)$ has the polarity and level responsive to the deviation of the magnetic head 1b from the track $Tb_1$. The tracking error as the deviation is corrected with the comparison output $(E_1 - E_2)$.

The comparison output $(E_1 - E_2)$ obtained when the magnetic head 1b scans the track $Tb_1$, is delayed by one field, by the delay circuit 70, and supplied through the drive circuit 56a to the bi-morph leaf assembly supporting the magnetic head 1a for the field when the magnetic head 1a scans the next track $Ta_2$. Since the tracking errors made on the adjacent tracks $Tb_1$ and $Ta_2$ are similar to each other, the tracking error made on the track $Ta_2$ is sufficiently corrected with the comparison output $(E_1 - E_2)$ obtained when the magnetic head 1b has scanned the track $Tb_1$. For the field when the magnetic head 1a scans the track $Ta_2$, the comparator 55 is generating an output having no concern with any tracking error. However, since the magnetic head 1b is not scanning the magnetic tape 3 for that field, the output of the comparator 55 does not affect the tracking of the magnetic head 1b.

Next, the magnetic head 1b scans the track $Tb_2$. Corresponding to the scanning positions on the tracks $Tb_2$ as shown in FIG. 16G, the detecting output $Sa_2$ of the pilot signal as the crosstalk component from the adjacent track $Ta_2$, and the detecting output $Sa_3$ of the pilot signal as the crosstalk component from the adjacent track $Ta_3$ are alternately generated at the period of $\tau$ from the peak detector circuit 52, as shown in FIG. 16H.

The pulses $Q_5$ and $\overline{Q_5}$ of opposite phase to each other are generated from the flip-flop 67, as shown in FIG. 16I and FIG. 16J. However, since the track $Tb_2$ is delayed from the track $Tb_1$ by one frame, the pulses $Q_5$ and $\overline{Q_5}$ of FIG. 16I and FIG. 16J are in opposite phases to the pulses $Q_5$ and $\overline{Q_5}$ of FIG. 16C and FIG. 16D. The sampling pulses $P_4$ and $P_5$ shown in FIG. 16K and FIG. 16L are generated from the sampling pulse generators 68 and 69. The detecting output $Sa_3$ of the pilot signal as the crosstalk component from the adjacent track $Ta_3$ is sampled with the sampling pulse $P_4$. The sampling output of the level of $E_1$ is obtained from the sampling hold circuit 53. The detecting output $Sa_2$ of the pilot signal as the crosstalk component from the adjacent track $Ta_2$ is sampled with the sampling pulse $P_5$. The sampling output of the level of $E_2$ is obtained from the sampling hold circuit 54. Since the switching pulse $Q_4$ is at the low level for the field when the magnetic head 1b scans the track $Tb_2$, the switching circuits 63 and 64 are connected at the other positions than the positions shown in FIG. 14. Accordingly, the comparison output $(E_2 - E_1)$ is generated from the comparator 55. As the result, the relationship between the direction of the tracking deviaion of the magnetic head 1b when scanning the track $Tb_1$ and the polarity of the comparison output of the comparator 55 is the same as the relationship between the direction of the tracking deviation of the magnetic head 1b when scanning the track $Tb_2$.

The switching circuits changed over at the frame period may be arranged at the output side of the comparator 55, of the flip-flop 67, or of the sampling pulse generators 68 and 69. In this embodiment, the flip-flop 67 is triggered with the horizontal synchronizing signal.

However, it may be triggered with output pulses of a horizontal scanning frequency obtained from a not-shown AFC circuit which is contained in the usual VTR.

Figure 17:
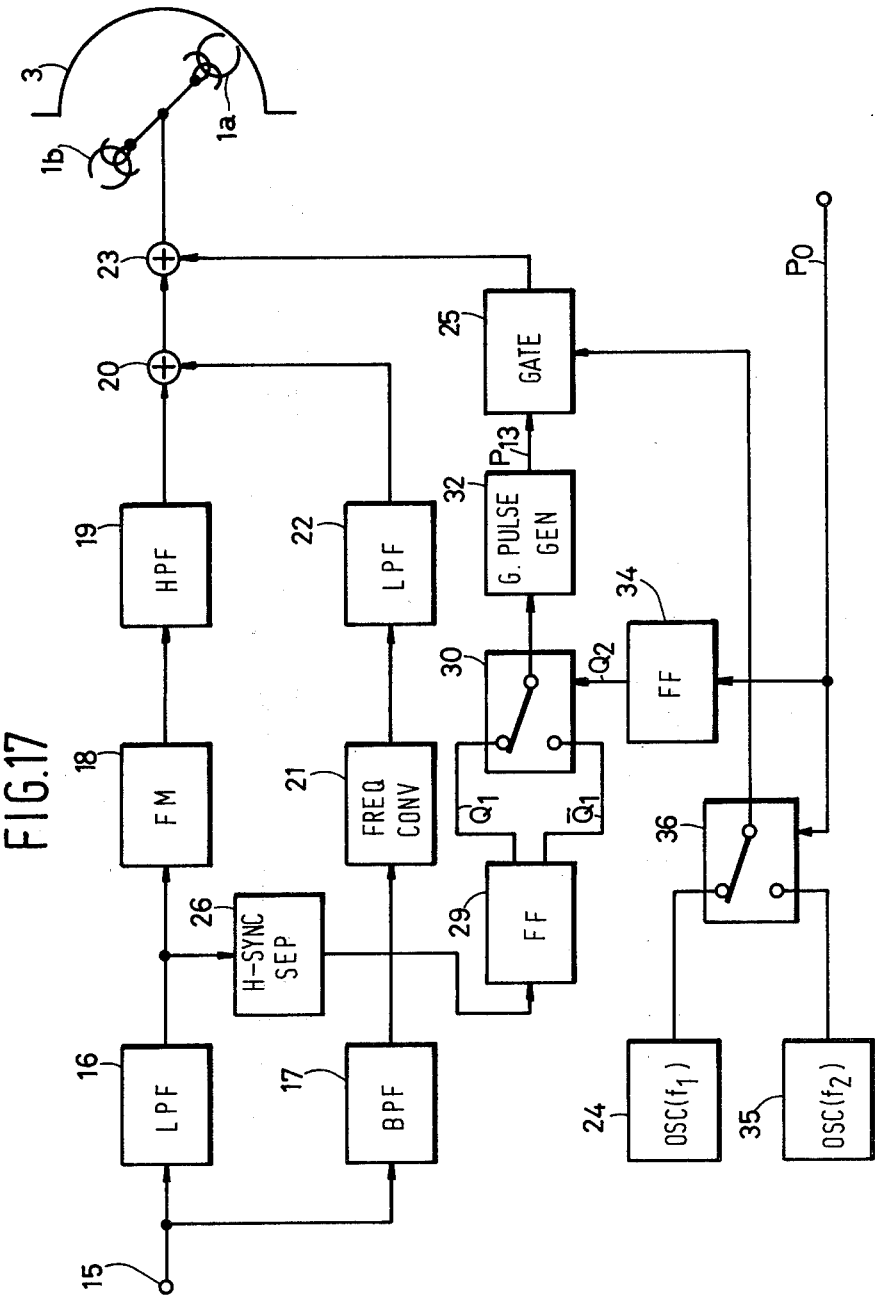
FIG. 17 is a block diagram of a recording system according to a further embodiment of this invention.
Figure 19:
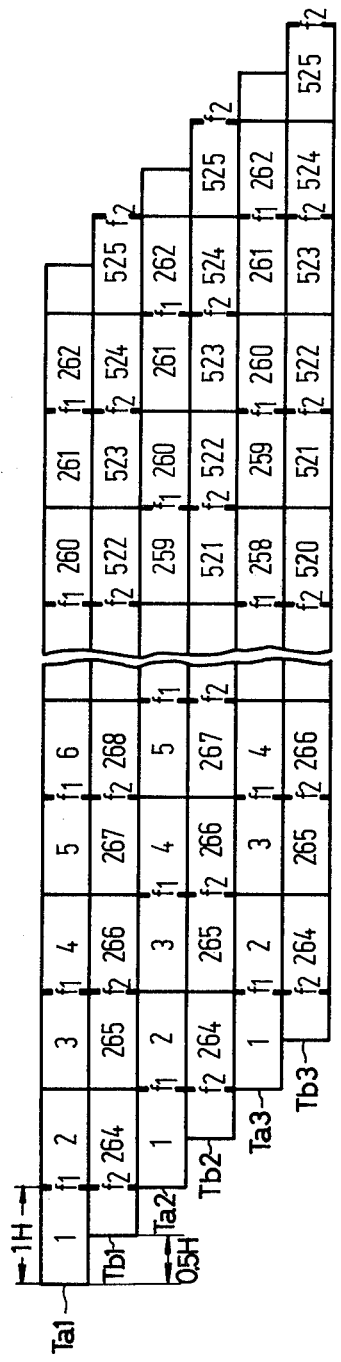
FIG. 19 is an enlarged plan view of a part of the recorded tracks according to the further embodiment of this invention.

FIG. 17 shows a recording system according to a further embodiment of this invention. This embodiment is different from the above-described second embodiment in that another pilot signal of frequency $f_2$ is recorded on the tracks $Tb_1$, $Tb_2$ —. The frequency $f_2$ is different from the frequency $f_1$ of the pilot signal recorded on the tracks $Ta_1$, $Ta_2$, —. As shown in FIG. 19, the record positions of the pilot signal on the tracks $Tb_1$, $Tb_2$ — are aligned with the record positions of the pilot signal on the tracks $Ta_1$, $Ta_2$ — respectively adjacent to the tracks $Tb_1$, $Tb_2$ —.

Next, the arrangement of the video signal recording system of FIG. 17 will be described. Parts in FIG. 17 which correspond to the parts in FIG. 11, are denoted by the same reference numerals.

In FIG. 17, the composite color video signal is applied to the input terminal 15, and supplied to the low pass filter 16 and to the band pass filter 17, as in the second embodiment. The output of the low pass filter 16 is supplied to the horizontal synchronizing separator 26 to separate the horizontal synchronizing signal. The horizontal synchronizing signal from the horizontal synchronizing separator 26 is supplied to the flip-flop 29. The outputs $Q_1$ and $\overline{Q}_1$ of the flip-flop 29 are alternatively selected by the switching circuit 30, and supplied the gate pulse generator 32.

In this embodiment, another oscillator 35 is included in addition to the oscillator 24. The other oscillator 35 generates a continuous wave of the frequency $f_2$ and the same fixed amplitude as the amplitude of the continuous wave of the one oscillator 24. The outputs of the oscillators 24 and 35 are supplied through a switching circuit 36 to the gate circuit 25. The switching circuit 36 is changed over at one field period with the head change-over pulse $P_0$.

Figure 18:
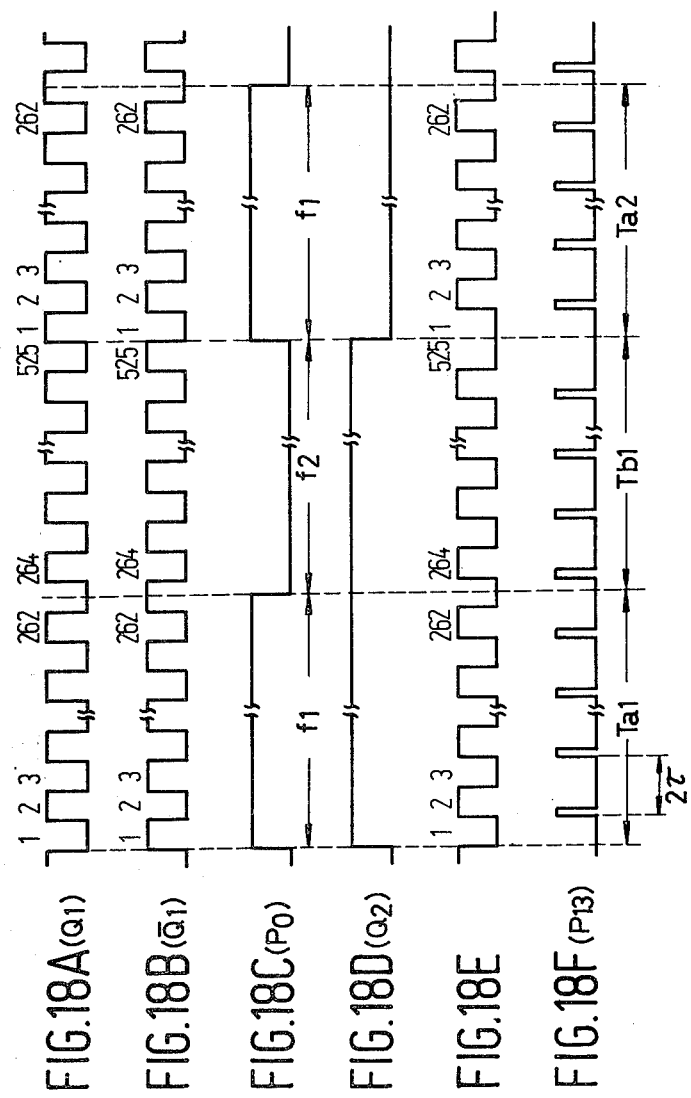
FIG. 18A to FIG. 18F are waveforms for explanation of operation of the system of FIG. 17.

The output pulses $Q_1$ and $\overline{Q}_1$ shown in FIG. 18A and FIG. 18B are obtained from the flip-flop 29 triggered with the horizontal synchronizing signal. FIG. 18C shows the head change-over pulse $P_0$. When the head change-over pulse $P_0$ is at the high level, namely when the tracks $Ta_1$, $Ta_2$ — are formed on the magnetic tape 3 by the magnetic head 1a, the continuous wave of the frequency $f_1$ from the oscillator 24 is supplied through the switching circuit 36 to the gate circuit 25. And when the head change-over pulse $P_0$ is at the low level, namely when the tracks $Tb_1$, $Tb_2$, — are formed by the magnetic head 1b, the continuous wave of the frequency $f_2$ from the oscillator 35 is supplied through the switching circuit 36 to the gate circuit 25.

The head change-over pulse $P_0$ is further supplied to the flip-flop 34. The switching pulse $Q_2$ shown in FIG. 18D is generated from the flip-flop 34 to control the switching circuit 30. The output pulses shown in FIG. 18E are generated from the switching circuit 30. The level of the output pulses is inverted at the period of $\tau$. Gate pulses $P_{13}$ synchronized with the leading edges of the output pulses of the switching circuit 30 are formed by the gate pulse generator 32. The continuous wave of the frequency $f_1$ or $f_2$ is passed through the gate circuit 25 with the application of the gate pulse $P_{13}$. Thus, the pilot signals to be included in the horizontal synchronizing signals of the video signal are formed, and mixed with the video signal from the adder 20, at the adder 23. The output of the adder 23 is recorded on the magnetic tape 3 through the magnetic heads 1a or 1b. A part of the pattern of the thus recorded tracks on the magnetic tape 3 is enlargedly shown in FIG. 19.

Figure 20:
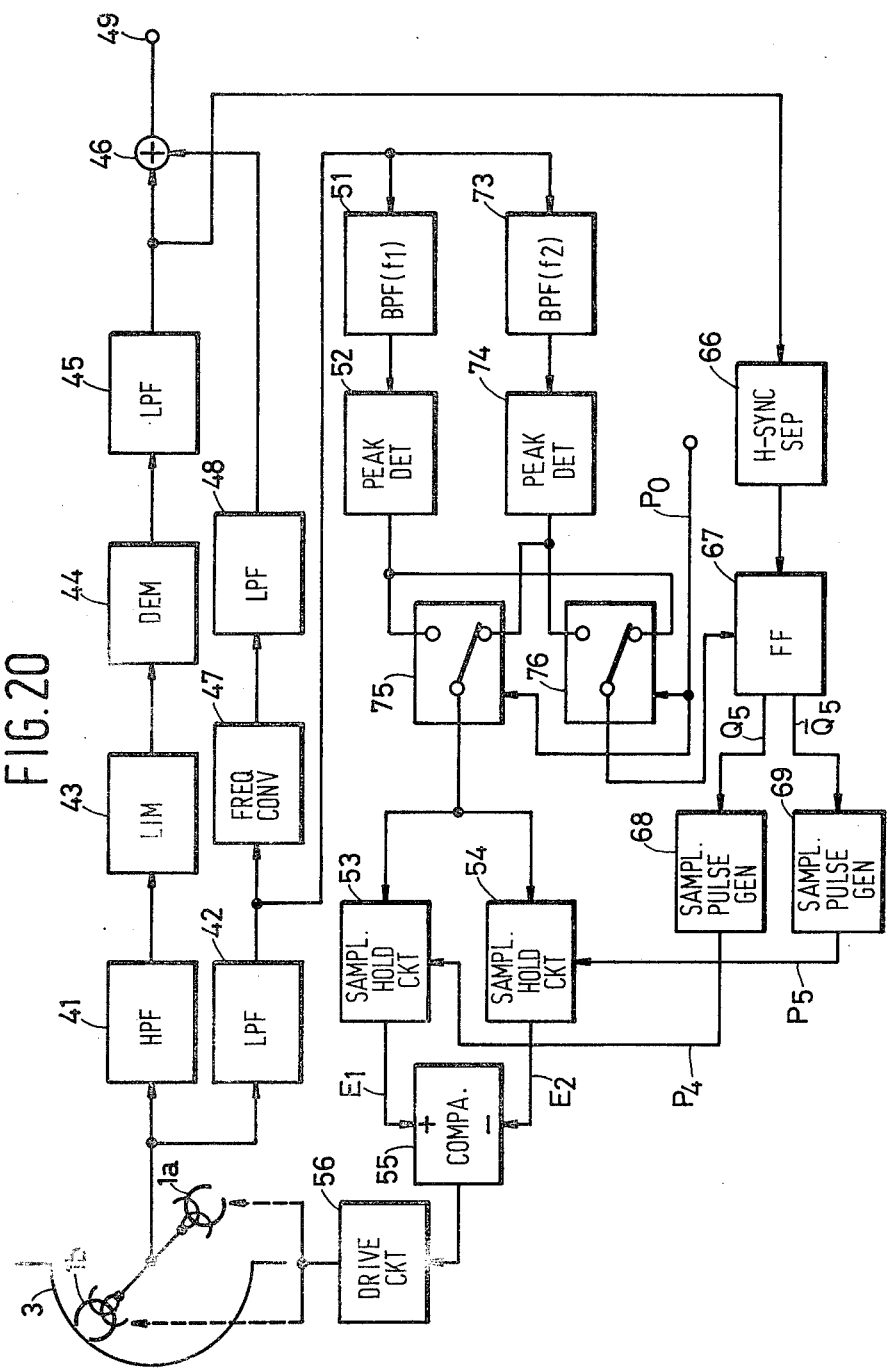
FIG. 20 is a block diagram of a reproducing system according to the further embodiment of this invention.

FIG. 20 shows a reproducing system for reproducing the video signal recorded on the magnetic tape 3 by the recording system of FIG. 17. Parts in this system which correspond to the parts in the system of FIG. 14, are denoted by the same reference numerals.

In FIG. 20, the reproduced RF signals from the magnetic heads 1a and 1b are supplied to the high pass filter 41 and the low pass filter 42. The frequency-modulated luminance signal is obtained from the high pass filter 41, and supplied through the limiter 43 to the FM demodulator 44. The output of the FM demodulator 44 is supplied to the low pass filter 45. The luminance signal is obtained from the low pass filter 45, and is supplied to the adder 46.

The down-converted chrominance signal and the pilot signals are obtained from the low pass filter 42, and supplied to the frequency converter 47. The output of the frequency converter 47 is supplied to the low pass filter 48. The chrominance signal is obtained from the low pass filter 48, and is supplied to the adder 46. The composite color video signal is obtained from the output terminal 49 of the adder 46.

The output of the low pass filter 42 is further supplied to the band pass filter 51 tuning with the frequency $f_1$ and to another band pass filter 73 tuning with the frequency $f_2$. The outputs of the band pass filters 51 and 73 are supplied to the peak detector circuit 52 and to a peak detector circuit 74, respectively. The detecting outputs of the peak detector circuits 52 and 74 are applied to switching circuits 75 and 76 which are changed over with the head change-over pulse $P_0$. When the head change-over pulse $P_0$ is at the high level, the switching circuits 75 and 76 are connected in the positions shown in FIG. 20, and the detecting output of the peak detector circuit 74 is supplied through the switching circuit 75 to the sampling hold circuits 53 and 54. On the other hand, the detecting output of the peak detector circuit 52 is supplied as a reset pulse through the switching circuit 76 to the flip-flop 67 which is triggered with the horizontal synchronizing signal supplied from the horizontal synchronizing separator 66.

When the head change-over pulse $P_0$ is at the low level, the switching circuits 75 and 76 are connected in other positions than the positions shown in FIG. 20, and the detecting output of the peak detecting circuit 52 is supplied through the switching circuit 75 to the sampling hold circuits 53 and 54. The detecting output of the peak detector circuit 74 is supplied as a reset pulse through the switching circuit 76 to the flip-flop 67.

The output pulses $Q_5$ and $\overline{Q}_5$ are obtained from the flip-flop 67. The sampling pulses $P_4$ and $P_5$ are formed in synchronization with the trailing edges of the output pulses $Q_5$ and $\overline{Q}_5$, by the sampling pulse generators 68 and 69, and supplied to the sampling hold circuits 53 and 54, respectively. The sampling outputs $E_1$ and $E_2$ of the sampling hold circuits 53 and 54 are supplied to the comparator 55. The comparison output ($E_1 - E_2$) of the comparator 55 is supplied to the drive circuit 56. The drive voltage from the drive circuit 56 is applied to the bi-morph leaf assemblies supporting the magnetic heads 1a and 1b. In this embodiment, the bi-morph leaf assemblies supporting the magnetic heads 1a and 1b are bent in opposite directions to each other with the common drive voltage.

Next, operations of the reproducing system of FIG. 20 will be described with reference to FIG. 21A to FIG. 21M.

Referring to FIG. 21A, when the magnetic head 1b scans the track $Tb_1$, the detecting output $Sa_1$ of the pilot signal as the crosstalk component from the adjacent track $Ta_1$, and the detecting output $Sa_2$ of the pilot signal as the crosstalk component from the adjacent track $Ta_2$ are alternately generated at the period $\tau$ from the one peak detector circuit 52, as shown in FIG. 21B. The higher detecting output of the pilot signal reproduced from the track $Tb_1$ is generated from the other peak detector circuit 74, as shown in FIG. 21C. The output pulses $Q_5$ and $\overline{Q_5}$ shown in FIG. 21D and FIG. 21E are generated from the flip-flop 67 to which the output of the peak detector circuit 74 is supplied as the reset pulse. The levels of the output pulses $Q_5$ and $\overline{Q_5}$ are inverted at the period $\tau$. The sampling pulses $P_4$ and $P_5$ shown in FIG. 21F and FIG. 21G are formed on the basis of the output pulses $Q_5$ and $\overline{Q_5}$. The sampling output of the level $E_1$ equivalent to the peak valve of the detecting output $Sa_1$ is obtained from the sampling hold circuit 53. And the sampling output of the level $E_2$ equivalent to the peak valve of the detecting output $Sa_2$ is obtained from the sampling hold circuit 54. The tracking of the magnetic head 1b is controlled with the comparison output $(E_1 - E_2)$ of the comparator 55.

Next, there will be described the case that the track $Ta_2$ is scanned by the magnetic head 1a, with reference to FIG. 21A.

The higher detecting output of the pilot signal of the frequency $f_1$ reproduced from the track $Ta_2$, shown in FIG. 21H, is generated from the peak detector circuit 52. Accordingly, the output pulses $Q_5$ and $\overline{Q_5}$ shown in FIG. 21J and FIG. 21K are generated from the flip-flop 67. On the other hand, the detecting output $Sb_1$ of the pilot signal as the crosstalk component from the adjacent track $Tb_1$, and the detecting output $Sb_2$ of the pilot signal as the crosstalk component from the adjacent track $Tb_2$ are alternately generated at the period $\tau$ from the other peak detector circuit 74, as shown in FIG. 21I. The detecting outputs $Sb_1$ and $Sb_2$ are sampled with the sampling pulses $P_4$ and $P_5$ shown in FIG. 21L and FIG. 21M. The sampling output of the level $E_2$ equivalent to the peak value of the detecting output $Sb_1$ is obtained from the sampling hold circuit 54. And the sampling output of the level $E_1$ equivalent to the peak value of the detecting output $Sb_2$ is obtained from the sampling hold circuit 53. The tracking of the magnetic head 1a is controlled with the comparison output $(E_1 - E_2)$ of the comparator 55.

As understood from the above, the relationship between the direction of the deviation of the magnetic head 1b from the track $Tb_1$ to be scanned and the polarity of the comparison output, is in opposition to the relationship between the direction of the deviation of the magnetic head 1a from the track $Ta_2$ to be scanned. However, the bi-morph leaf assemblies supporting the magnetic heads 1a and 1b are so designed as to be bent in opposite directions to each other with the common drive voltage corresponding to the compariosn output. For example, the directions of the polarizations of the piezo-electric elements 7 and 9 are made to differ from each other. Accordingly, the tracking error is always corrected with respect to all of the tracks.

In this embodiment, the bi-morph leaf assemblies supporting the magnetic heads 1a and 1b are so designed as to be bent in opposite directions to each other with the common drive voltage. However, alternatively, the comparison output of the comparator 55 may be so designed as to be inverted at every other field.

In the above-described embodiments, the pilot signal is inserted into the horizontal blanking period of the video signal. Accordingly, the pilot signal has no adverse influence on the reproduced picture, while the deviation of the magnetic head from the recorded track to be scanned is detected and the magnetic head is so deflected as to scan correctly the recorded track. The reproduction characteristic such as signal to noise ratio S/N can be satisfactory.

However, when the frequency of the pilot signal is suitably selected, the pilot signal may be inserted into any period subsequent to the horizontal blanking period of the video signal. Also in such a case, it is required that the pilot signal is intermittently inserted into the video signal, and further that the record positions of the pilot signals are so arranged that the pilot signals are not simultaneously reproduced from the two tracks adjacent to the track to be scanned. In that recording system, the frequency $f_1$ or $f_2$ of the pilot signals may be 80 to 120 Hz.

In the above-described embodiments, the tracking error is detected at every period of $2\tau$ or $3\tau$, and so the tracking can be controlled with high accuracy. The embodiments of the present invention have an even greater advantage over prior art devices for the slower recording/reproducing operation than for the normal recording/reproducing operation.

Further in the above-described embodiments, the pilot signal is mixed with the frequency-modulated luminance signal. However, the pilot signal may be mixed in any other manner. For example, a high frequency signal of a predetermined frequency may be supplied as a modulation signal to the FM modulator 18 together with the video siganl. In that case, a sideband of the FM output is used as the pilot signal.

When it is undesirable that the pilot signal remains in the color video signal passed through the reproducing system, the pilot signal may be muted at the input side of the adder with pulses of the horizontal scanning period.

Although this invention is applied to the VTR of the rotary two-head type, it may be applied to any other video signal recording/reproducing apparatus such as a VTR of one-head type. In the VTR in which the tape running speed can be changed over to change the recording time, the tracking error may be detected to automatically control the head scanning, only in the long-play recording/reproducing operation.

Of course, this invention may be applied to a monochromatic VTR, although it is applied to a color VTR in the above embodiments.

Further, this invention may be applied to a VTR of the type which is disclosed in the U.S. Pat. No. 3,830,961 and in which the reproduced signal as the crosstalk component from the adjacent track is suppressed by azimuth loss of the magnetic heads 1a and 1b which differ from each other in inclination of their respective gaps.

Although the above-embodiments are applied to the VTR of the type in which the horizontal synchronizing signals are recorded on the magnetic tape so that the record positions of the horizontal synchronizing signals on the adjacent tracks are aligned with each other, this invention may be applied to a VTR of any other type in which the record positions of the horizontal synchronizing signals on the adjacent tracks are shifted from each other, when the pilot signals are intermittently recorded at the predetermined interval at least on every other one of the tracks.

It will be apparent that many modifications and variations could be effected by one skilled in the art without departing from the spirit or scope of the novel concepts of the present invention.

What is claimed is:

1. A video signal recording apparatus comprising:
    means for recording video signals containing regularly occurring synchronizing signals in parallel record tracks on a record medium; and
    means for inserting at least one pilot signal into said video signals intermittently and at a predetermined interval determined by said synchronizing signals in at least every other one of said tracks so that said pilot signals in a track to be scanned and in the tracks adjacent thereto are out of alignment with one another.

2. A video signal recording apparatus according to claim 1, in which said means for inserting a pilot signal includes oscillator means for providing said pilot signal, means for providing a gating pulse in response to a succession of a predetermined number of said synchronizing signals, gating means for gating said pilot signal in response to said gating pulse, and combining means for inserting the gated pilot signal into said video signals.

3. A video signal recording apparatus according to claim 2; in which said means for recording video signals includes means for achieving alignment of the synchronizing signals recorded in adjacent record tracks, and said predetermined number of synchronizing signals is selected so that the pilot signals recorded in a track to be scanned, and in the tracks adjacent thereto, are out of alignment with each other.

4. A video signal recording apparatus according to claim 2; in which said means for inserting a pilot signal further includes enabling means for enabling said gating means only during the recording of said video signals in every other track.

5. A video signal recording apparatus according to claim 4; in which said means for providing a gating pulse includes a bistable circuit having a normal and an inverted output and being triggered by said synchronizing signals, switching means operative in response to said enabling means for alternatively selecting said normal output and said inverse output after every two consecutive tracks are formed, and pulse generator means connected with said switching means for generating said gating pulse.

6. A video signal recording apparatus according to claim 2; in which said oscillator means includes a first oscillator for generating a first pilot signal of one frequency and a second oscillator for generating a second pilot signal of another frequency, and switch means for applying said first pilot signal to said gating means during the recording of said video signals in every other record track, and for applying said second pilot signal to said gating means during the recording of said video signals in the tracks between said every other tracks.

7. A video signal recording apparatus according to claim 6; in which said means for providing a gating pulse includes a bistable circuit having a normal output and an inverted output and being triggered by said synchronizing signals, a pulse generator providing said gating pulse, and switching means for alternately connecting said normal output and said inverted output to said pulse generator during recording of said video signals in every other track.

8. A video signal reproducing apparatus for reproducing video signals recorded in parallel tracks on a record medium and having a pilot signal intermittently recorded therein so as to occur at different locations in adjacent tracks, said pilot signals in a track to be scanned and in the tracks adjacent to said track to be scanned being out of alignment with one another, and said pilot signals occurring at intervals bearing a fixed relation to a regularly occurring synchronizing signal contained in said video signal, comprising:
    transducer means scanning said tracks to sense said recorded video signals and to reproduce the same;
    means for separating said pilot signals from said reproduced video signals;
    timing means to sample the level of said pilot signals recorded in tracks adjacent the track being scanned by said transducer means;
    comparator means for comparing the level of the sampled pilot signals reproduced from the tracks adjacent opposite sides of the track being scanned, and producing an error signal in response to the comparison of said levels; and
    means for deflecting said transducer means in response to said error signal so as to center the scanning path of said transducer means between the tracks adjacent the track being scanned.

9. A video signal reproducing apparatus according to claim 8; in which said timing means includes peak detector means for sensing the presence of a reproduced pilot signal, sampling pulse generator means providing a first sampling pulse at a time which is delayed after the occurrence of a pilot signal in the track being scanned so as to occur when a pilot signal occurs in the track adjacent to one side of said scanned track, and providing a second sampling pulse at a time which is delayed after the occurrence of a pilot signal in said scanned track so as to occur when a pilot signal occurs in the track adjacent the other side of said scanned track, and first and second sampling circuits for sampling said pilot signals in response to said respective first and second sampling pulses.

10. A video signal reproducing apparatus according to claim 8; in which said pilot signal is recorded only in alternating parallel tracks, and said transducer means includes two rotary reproducing heads arranged so that one of said heads scans tracks which have no pilot signals recorded in the tracks adjacent thereto; and in which said means for deflecting said transducer means includes a delay circuit for delaying said error signal by the duration of time required to scan one track, and means for controlling the deflection of said one head, thereby substantially centering the path of said one head between said tracks adjacent the track scanned by said one head.

11. A video signal reproducing apparatus according to claim 10; wherein said timing means includes a bistable circuit having normal and inverse outputs and being triggered by said regularly occurring synchronizing signal, first and second sampling circuits responsive to said normal and inverse outputs for sampling the levels of pilot signals recorded in the tracks and adjacent the opposite sides, respectively, of and means providing said sampled levels to said comparator means.

12. A video signal reproducing apparatus according to claim 11; further including switch means interposed between said sampling circuits and said comparator means for reversing the connection between said sampling circuits and said comparator means each time one of said two rotary heads scans a track.

13. A video signal reproducing apparatus according to claim 8; in which said pilot signal is recorded with a first frequency in every other parallel track, and with a second frequency in the parallel tracks between said every other track; and in which said timing means includes selecting means for selecting the pilot signal with said first frequency during reproducing of said alternating tracks and the pilot signal of said second frequency during reproducing of said every other track.

14. A video signal reproducing apparatus according to claim 13; in which said timing means further includes a bistable circuit having normal and inverted outputs and being triggered by said regularly occurring synchronizing signals, first and second sampling circuits connected with said normal and inverted outputs, respectively, and with said selecting means for sampling the respective levels of pilot signals recorded in the tracks adjacent opposite sides of said scanned track, and means providing said sampled levels to said comparator means.

* * * * *